United States Patent
Looi et al.

[11] Patent Number: 5,996,038
[45] Date of Patent: Nov. 30, 1999

[54] INDIVIDUALLY RESETTABLE BUS EXPANDER BRIDGE MECHANISM

[75] Inventors: Lily Pao Looi, Portland; Sin Tan, Hillsboro; James Andrew Sutton, II, Portland, all of Oreg.

[73] Assignee: Intel Corporation, Santa Clara, Calif.

[21] Appl. No.: 09/013,773

[22] Filed: Jan. 26, 1998

[51] Int. Cl.⁶ .............................. G06F 13/00; G06F 13/40; G06F 13/42
[52] U.S. Cl. ........................... 710/129; 710/128; 710/101
[58] Field of Search ..................................... 710/129, 128, 710/126, 101, 2, 104; 714/23; 713/400

[56] References Cited

U.S. PATENT DOCUMENTS

| | | | |
|---|---|---|---|
| 5,734,850 | 3/1998 | Kenny et al. | 710/129 |
| 5,815,647 | 9/1998 | Buckland et al. | 714/3 |
| 5,859,987 | 1/1999 | Gillespie et al. | 710/128 |
| 5,867,676 | 2/1999 | Nguyen et al. | 710/129 |

Primary Examiner—Gopal C. Ray
Attorney, Agent, or Firm—Antonelli, Terry, Stout & Kraus, LLP

[57] ABSTRACT

A computer system including individually resettable bus expander bridges is described. A master bus controller provides an interface between at least one processor and at least one independently resettable bus expander bridge associated with one or more expansion buses. A bus expander bridge can be reset independently from the rest of the system when the master bus controller asserts a reset control signal that is applied to the bus expander bridge without affecting the operation of any other bus expander bridges or devices in the computer system not directly coupled to the expansion bus(es) being reset. When a reset control signal is asserted, the bus expander bridge being reset and the bus(es) associated with the bus expander bridge are reset to a default state. Once the reset process has had sufficient time for completion, the reset control signal is deasserted by the master bus controller and the bus expander bridge resumes operation.

21 Claims, 3 Drawing Sheets

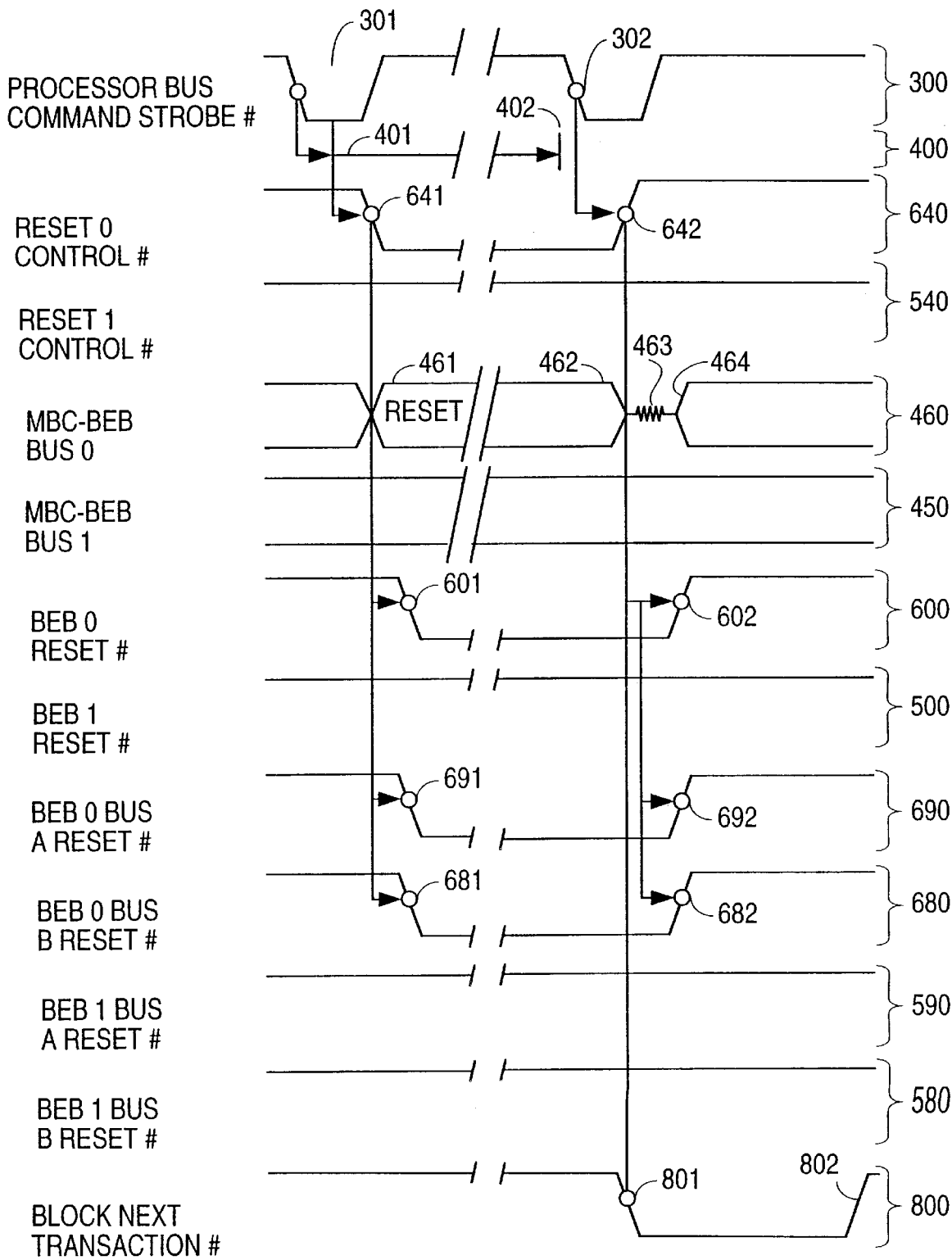

5,996,038

INDIVIDUALLY RESETTABLE BUS EXPANDER BRIDGE MECHANISM

FIELD OF THE INVENTION

The present invention is directed to computer architecture. More particularly, the present invention is directed to an individually resettable bus expander bridge in a system chipset that allows an expander bridge and buses associated therewith to be reset without requiring that the entire system be reset simultaneously therewith.

BACKGROUND OF THE INVENTION

In a typical computer system, a processor interfaces with a plurality of peripheral devices on one or more expansion buses. An expansion bus is an electrical pathway used to interconnect a computer motherboard and peripheral devices. There are many different types of expansion buses, and the specific architecture of an expansion bus is dependent upon the specific computer system being implemented. However, several bus architecture standards have been developed that have allowed the designers of peripheral interface devices to design products that are compatible with the bus rather than being limited to a single computer system. Examples of bus architectures include the Industry Standard Architecture ("ISA") and the Extended Industry Standard Architecture ("EISA"). Intel Corporation defined an expansion bus architecture that is optimized for fast data transfers and is itself readily expandable, the Peripheral Component Interface ("PCI") Local Bus. The PCI Local Bus standard is presently maintained by a consortium, the PCI Special Interest Group ("PCI SIG").

The PCI bus specification provides for a finite number of devices that may be simultaneously interfaced to a single implementation of a PCI bus. Although the PCI Local Bus specification, (version 2.1, Jun. 1, 1995), logically supports 32 physical PCI device packages, a typical PCI bus implementation supports ten electrical loads (five connectors and five devices interfaced via the connectors). However, it is frequently considered desirable to interface more than five devices attached via connectors in a computer system. Moreover, there are numerous peripheral devices that were designed for operation with previous bus architectures, such as ISA or EISA. Although many peripheral interconnect devices have been redesigned to take advantage of the benefits of the PCI bus, a large number of have not. In order to allow for larger PCI buses and/or interfacing with devices configured for other bus architectures, a system by which a PCI bus can be expanded to include additional PCI buses and/or non-PCI buses has been developed using expander bridges. Expander bridges are not limited to just PCI buses, and have been developed for use with other bus architectures, as well as to interconnect heterogenous buses, such as a PCI to ISA.

A typical prior art PCI expander bridge is a device positioned on a PCI bus that allows additional PCI buses to be interconnected with the PCI bus on which the PCI expander bridge is installed. In prir art systems, a next PCI expander bridge could be positioned on the expansion bus, downstream from the preceding PCI expander bridge, effectively multiplying the capaci of the PCI bus by the number of expander bridges interconnected on the PCI bus.

In a computer system that in ludes a master bus controller device coordinating bus activities with the processor bus, such as, for example, the Memory and Input/Output Bridge Controller developed by Intel Corporation as part of the 82450NX chipset, the PCI expander bridges may be config ed in parallel rather than in a hierarchical series configuration.

In addition to providing additional expansion slots for peripheral devices, expansion buses also advantageously separate potentially incompatible devices from each other when the devices are installed in separate expansion buses as well as limiting the number of devices a malfunctioning device will be sharing a common bus with. When a device stops functioning correctly, that device may lock up the bus to which it is connected by preventing any other devices on the bus from accessing the bus, effectively disabling all other devices connected to that bus as well. A device may malfunction for any number of reasons, including, for example, an intermittent or non-recurring error caused by interaction with another device on the bus or a "soft" error caused by software or a specific sequence of events. When an expansion bus ceases to operate correctly because of one of these kinds of errors, the problem can often corrected by returning the bus and the devices connected thereon to an initialization or reset state, without requiring replacement of the malfunctioning device or device.

In prior art systems, however, this is typically accomplished by resetting the entire system. Unfortunately, this disadvantageously requires disruption of all operations in the system, including operations of devices that are separate and distinct from the expansion bus upon which the problem is occurring and which may be able to continue operation without the devices on the expansion bus experiencing problems. Moreover, if the system is a network server, then an entire network of computer systems may be disabled and require reset operations when the network server is reset. A readily isolated and relatively soluble problem could possibly bring down an entire network.

Based on the foregoing, there is a need for independently resettable expander bridges that allow an expander bridge (and the expansion buses associated therewith) to be reset without requiring a reset of the host system.

SUMMARY OF THE INVENTION

According to an embodiment of the present invention, a mechanism is provided for independently resetting a bus expander bridge in a computer system including a master bus controller. A master bus controller provides an interface between a processor or host bus and at least one independently resettable bus expander bridge associated with one or more expansion buses and may be for example, a bus expander bridge, a dedicated bus controller, or a multi-purpose controller integrating memory, input/output, and bridge control. Whenever a bus expander bridge is to be reset independently from the rest of the system, the master bus controller asserts a reset control signal that is applied only to the bus expander bridge being reset and does not affect the operation of any other bus expander bridges or devices in the computer system not directly coupled to the expansion bus(es) being reset.

When a reset control signal is asserted, the bus expander bridge is reset to a default condition and a local bus reset signal is asserted by the bus expander bridge and applied to the bus(es) associated with the bus expander bridge. The reset control signal is subsequently deasserted, followed by deassertion of the local bus reset signal(s) and completion of the bus expander bridge reset process.

Once the reset process is completed, the bus expander bridge is ready to resume normal operation and the rest of the system remains unaffected by the independent reset of the bus expander bridge.

BRIEF DESCRIPTION OF THE DRAWINGS

FIG. 3 is a timing diagram of the sequence of operations by which a bus expander bridge is reset in accordance with one embodiment of the present invention.

DETAILED DESCRIPTION

Figure 1:
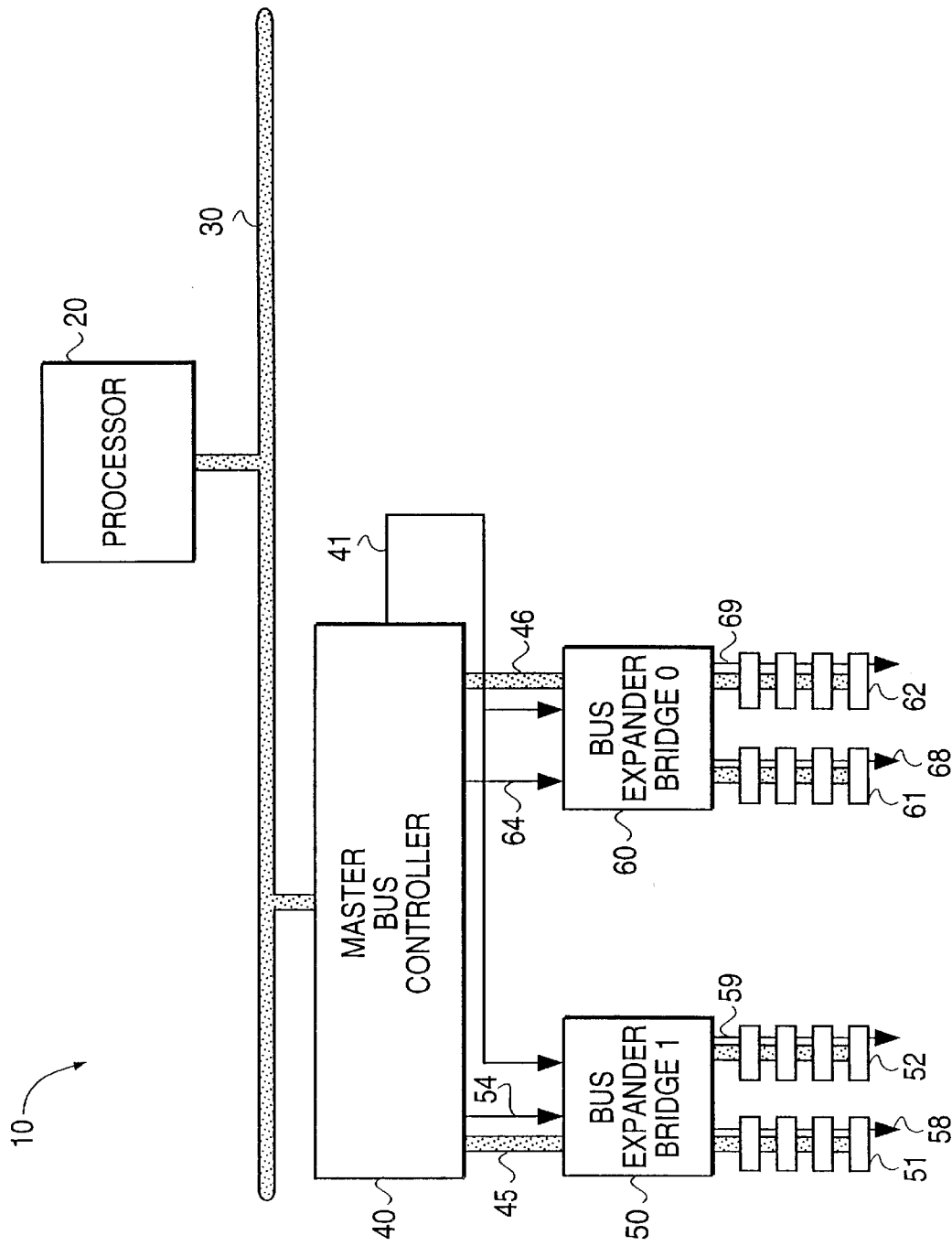
FIG. 1 is a block diagram of a computer system in accordance with an embodiment of the present invention.

An exemplary embodiment of the present invention is illustrated by the block diagram of a computer system 10 in FIG. 1. In the illustrated embodiment, processor 20 is interfaced to a processor bus 30. Although only one processor is shown for illustrative purposes, a plurality of processors may be interfaced to processor bus 30 in an embodiment of the present invention implemented in a multiprocessor or distributed processor system (not shown). A master bus controller 40 is also interfaced to processor bus 30 and is in communication with processor 20 thereby. Master bus controller 40 interfaces with a plurality of bus expansion bridges 50 and 60. Each bus expansion bridge may support one or more expansion buses. In the illustrated embodiment, bus expansion bridges 50 and 60 each support two expansion buses, 51 and 52 and 61 and 62, respectively. Although two bus expansion bridges are shown for illustrative purposes, the present invention may be implemented with only one bus expansion bridge or more than two bus expansion bridges (not shown).

The master bus controller 40 interfaces with the bus expander bridges 50 and 60 across buses 45 and 46, data and control buses that provide communication of data and control signals between the master bus controller 40 and bus expander bridges 50 and 60. In an embodiment of the present invention, buses 45 and 46 are bi-directional split field transaction buses that communicate commands, addresses, data, transaction information and multi-purpose bit fields between the interconnected devices. In an embodiment of the present invention, buses 45 and 46 may be implemented by flexible conductors or cables, allowing the expansion buses interfaced by the bus expander bridges to be physically distinct and, if desired, separately powered from the host system.

In the embodiment of the invention illustrated in FIG. 1, there are two control signals associated with expander bridge reset shown between master bus controller 40 and each bus expander bridge 50 and 60. During reset, the state machines, configuration registers and internal logic of the bus expander bridge are returned to a default state. The first control signal, buffered power good signal 41, is a global reset signal that is asserted to indicate clean power supplies and clock signals. In an embodiment of the present invention, the buffered power good signal 41 is controlled by a power good signal input to the master bus controller 40 (not shown). Buffering the power good signal through the master bus controller 40 allows for enhanced signal routing efficiency and ensures that the buffered signal is adequately driven when applied to bus expander bridges interfaced to the master bus controller 40 across cables, as well as providing the capability of asserting or deasserting the buffered power good signal independently from the power good signal input to the master bus controller 40.

The second control signal associated with resetting a bus expander bridge is the reset control signal. There is a separate reset control signal associated with each bus expander bridge. Referring to FIG. 1, reset control signal 54 is associated with bus expander bridge 50 and reset control signal 64 is associated with bus expander bridge 60. Reset control signal 54 is asserted by master bus controller 40 to reset bus expander bridge 50 and reset control signal 64 is asserted by master bus controller 40 to reset bus expander bridge 60. When reset control signal 54 is asserted, bus 45 between master bus controller 40 and bus expander bridge 50 is also reset. Bus 45 remains in a reset state until bus expander 50 completes the reset process and, if necessary, bus synchronization is completed. Bus synchronization is dependent upon the type of bus implemented between the master bus controller 40 and the bus expander bridges 50 and 60 and may not be necessary in some implementations with unsynchronized buses. Bus expander bridge 50 responds to reset control signal 54 by asserting an internal reset signal (not shown) and local bus reset signals 58 and 59 which are applied to expansion buses 51 and 52, respectively. The internal reset signal resets the configuration registers, state machines and logic in bus expander bridge 50 whereas local bus reset signals 58 and 59 are applied to the peripheral devices interconnected upon expansion buses 51 and 52. Similarly, when bus control signal 64 is asserted by master bus controller 40 to reset bus expander bridge 60, bus 46 between master bus controller 40 and bus expander bridge 60 is also reset. Bus 46 remains in a reset state until bus expander 60 completes the reset process and, if necessary, bus synchronization is completed. Bus expander bridge 60 responds to reset control signal 64 by asserting an internal reset signal (not shown) and local bus reset signals 68 and 69 which are applied to expansion buses 61 and 62, respectively. The internal reset signal resets the configuration registers, state machines and logic in bus expander bridge 60 whereas local bus reset signals 68 and 69 are applied to the peripheral devices interconnected upon expansion buses 61 and 62.

In an embodiment of the present invention implemented with PCI bus expander bridges, both the reset control signal 54 (or 64) applied to bus expander bridge 50 (or 60) and the local bus reset signals 58 and 59 (or 68 and 69) applied to the expansion buses remain asserted until a determination is made to deassert reset of the bus expander bridge 50 (or 60). In an embodiment of the present invention, this determination is made by processor 20 and indicated to master bus controller 40 across processor bus 30. Processor 20 may indicate to master bus controller 40 that a bus expander bridge reset should be asserted and deasserted in consecutive time intervals without consideration as to whether sufficient time has elapsed for the reset process to complete. Accordingly, the master bus controller 40 may initiate a timer when a reset control signal 54 (or 64) is asserted and prohibit deassertion of the reset control signal 54 (or 64) until the reset process has had enough time to complete as indicated by the timer. The timer interval is implementation specific and varies with, for example, the clock speed or the types of expansion buses. In alternative embodiments of the present invention, the processor operating software may prohibit indicating to master bus controller 40 that an asserted reset control signal should be deasserted until an implementation specific required interval has elapsed or until master bus controller 40 indicates that the reset process has either completed or had sufficient time to complete. In another alternative embodiment of the present invention, the asserted reset control signal may be automatically deasserted following a specified time interval.

Once reset control signal 54 (or 64) is deasserted, reset bus expander bridge 50 (or 60) remains in a reset state with the internal reset and local bus reset signals 58 and 59 (or 68 and 69) until communication with master bus controller 40 can be reestablished. In an embodiment of the present invention wherein the buses 45 and 46 are synchronized buses, the reset bus must be resynchronized and the reset bus expander bridge delays deasserting the reset signals until resynchronization. In alternative embodiments of the present invention where bus 45 between the master bus controller 40 and bus expander bridge 50 is not synchronized, bus expander bridge 50 may deassert the internal reset and local bus reset signals 58 and 59 when the reset control signal 54 is deasserted without waiting for bus resynchronization.

When the reset process has completed, bus expander bridge 50 (or 60) is in a default state and must be reconfigured. The configuration information should be coordinated with any configuration information held by master bus controller 40 and any differences reconciled.

Figure 2:
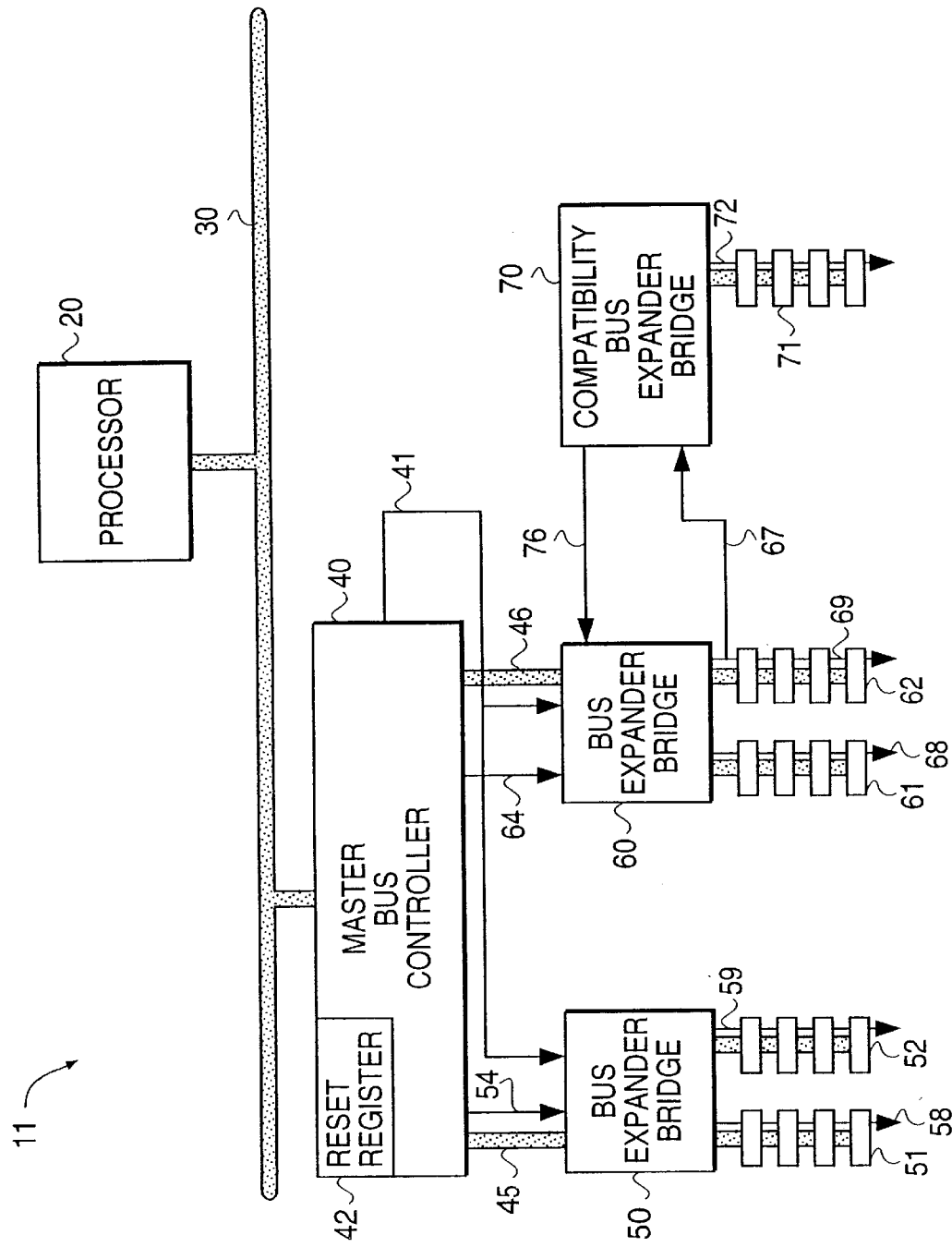
FIG. 2 is a block diagram of a computer system in accordance with an alternative embodiment of the present invention.

Referring to FIG. 2, a more detailed representation of the present invention including a compatibility bus expansion bridge 70 is shown. In the computer system 11 shown, master bus controller 40 includes a reset register 42. In an embodiment of the present invention, reset register 42 is a multi-bit register wherein a bit is associated with each bus expander bridge interfaced with master bus controller 40. When master bus controller 40 determines that a bus expander bridge should be reset, such as when, for example, processor 20 issues a command on host bus 30 enabling reset of a specified bus expander bridge, the bit in reset register 42 corresponding to the specified bus expander bridge is set. The bit in reset register 42 corresponding to the bus expander bridge being reset is subsequently reset after the bus expander bridge reset process has been initiated. In an embodiment of the present invention, the bit is reset by a command on host bus 30 indicating the bus expander bridge reset should be disabled. Additional bits in reset register 42 (that are not associated with a bus expander bridge) may be used in conjunction with internal counter logic to control a timer preventing the reset control signal from being deasserted before sufficient time has elapsed for completion of the reset process. This allows processor 20 to assert a bus expander bridge reset disable command without waiting for the reset process to complete. The reset register bit and the timer output may be logically combined to prevent deassertion of the reset control signal until the associated bit in reset register 42 is reset and the predetermined interval has elapsed.

The present invention is not limited to a single type of expansion bus or bus expander bridges directly interfaced with master bus controller 40. Referring again to FIG. 2, compatibility bus expander bridge 70 is operably coupled to bus expander bridge 60 and is reset concurrently therewith. Compatibility bus expander bridge 70 is associated with a compatibility bus 71 having a different bus architecture than expansion buses 51, 52, 61 and 62. For example, in an implementation of the present invention where buses 51, 52, 61 and 62 are PCI buses, compatibility bus 71 could be an ISA bus that allows computer system 11 to be compatible with ISA bus devices and compatibility bus expander bridge 70 is a PCI-ISA bridge.

In the embodiment of the present invention illustrated, a reset control input 67 of compatibility bus expander bridge 70 is operably coupled to local bus reset signal 69. Accordingly, reset control input 67 is asserted when local bus reset signal 69 is asserted to reset the expansion bus 62 associated with bus expander bridge 60. Upon assertion of reset control input 67, compatibility bus expander bridge 70 begins the reset process, asserting local bus reset 72 to reset the devices interconnected on compatibility bus 71. After local bus reset signal 69 is deasserted by bus expander bridge 60, compatibility bus expander bridge 70 begins completion of its reset routine during which local bus reset 72 is deasserted followed by assertion of compatibility bus expander bridge OK signal 76 operably coupled to bus expander bridge 60. The intervals between deassertion of reset control input 67 and deassertion of local bus reset signal 69 and assertion of compatibility bus expander bridge OK signal 76 are implementation specific and depend upon the particular compatibility bus expander bridge 70. Assertion of compatibility bus expander bridge OK signal 76 indicates to bus expander bridge 60 that compatibility bus 71 is operational.

Independent reset of a bus expander bridge in an embodiment of the present invention is represented in a timing diagram shown in FIG. 3. In the embodiment illustrated by FIGS. 1 and 3, the reset operation is enabled by a command from an agent, such as processor 20, on processor bus 30. This command is received by master bus controller 40 when processor bus command strobe 300 is asserted at 301. In FIG. 3, an active low signal is indicated by a "#" appended to the signal description. Master bus controller 40 responds to the command by starting a timer 400 at time 401 and asserting the reset control signal coupled to the bus expander bridge identified by the received command. In the embodiment illustrated in FIG. 3, bus expander bridge 60 is identified by the received command and reset 0 control 640 is asserted at 641. Reset 1 control 540 remains in a deasserted state. The master bus controller-to-bus expander bridge bus 46 is placed in and held at a reset state at 461 while the master bus controller-to-bus expander bridge bus 45, associated with bus expander bridge 50, is unaffected as shown by 450. The internal reset 600 of bus expansion bridge 60 is asserted at 601 and local bus reset signals 680 and 690 are simultaneously asserted at 681 and 691. Internal reset 500 and local bus reset signals 580 and 590 of bus expansion bridge 50 remains unasserted.

In the illustrated embodiment, a reset disable command is received by master bus controller 40 when processor bus command strobe 300 is asserted at 302. Referring to FIG. 3, timer 400 has completed counting the interval at 402 and reset control 640 is deasserted at 642. When reset control 640 is deasserted, master bus controller 40 asserts a block next transaction signal 800 on the processor bus 30 to prevent processor 20 from initiating any transactions that may involve bus expander bridge 60 until the reset process is completed. In an embodiment of the present invention, block next transaction signal 800 is asserted at 801 for a predetermined interval that ensures the reset process has sufficient time to complete following deassertion of the reset control signal.

The master bus controller-to-bus expander bridge bus 46 is released from the reset state at 462, at the same time reset control signal 642 is deasserted. In the illustrated embodiment where master bus controller-to-bus expander bridge bus 46 is synchronized, the bus has to be resynchronized as shown at 463. Once master bus controller-to-bus expander bridge bus 46 is synchronized at 464, bus 46 is ready to communicate and bus expander bridge 60 can complete the reset process. Accordingly, internal reset 600 of bus expansion bridge 60 is deasserted at 602 and local bus reset signals 680 and 690 are simultaneously deasserted at 682 and 692. When block next transaction signal 800 is deasserted at 802, bus expander bridge 60 is ready to be reconfigured and resume operation.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, according to an alternative embodiment of the present invention, an error status register of the master bus controller may be set by an expander bridge indicating that one or more expander bridges should be reset. According to another alternative embodiment of the present invention, the master bus controller may generate a reset control signal that is applied to a bus expander bridge and then deasserted after an interval without requiring receipt of a command instructing the master bus controller to disable reset. In another alternative embodiment, the reset control signal is deasserted upon receipt of an appropriate signal from the bus expander bridge being reset.

What is claimed is:

1. A computer system including at least one processor and a first bus configured to be coupled to said processor, said computer system comprised of:
    a first device coupled to said first bus;
    a second bus configured to be coupled to said first device and to a first bus expander bridge;
    a first connection configured to be coupled between said first device and said first bus expander bridge, said first connection operable to couple a first bridge reset signal between said first device and said first bus expander bridge independent of a system reset signal; and
    said first bus expander bridge having at least one expansion bus associated therewith and a second connection configured to be coupled between said expansion bus and said first bus expander bridge, said second connection operable to couple a first bus reset signal between said expansion bus and said first bus expander bridge responsive to said first bridge reset signal.

2. The computer system of claim 1 further comprising:
    a third bus configured to be coupled to said first device and to a second bus expander bridge;
    a third connection configured to be coupled between said first device and said second bus expander bridge, said third connection operable to couple a second bridge reset signal between said first device and said second bus expander bridge independent of the system reset signal and said first bridge reset signal; and
    said second bus expander bridge having at least one expansion bus associated therewith and a fourth connection configured to be coupled between said associated expansion bus and said second bus expander bridge, said second connection operable to couple a second bus reset signal between said associated expansion bus and said second bus expander bridge responsive to said second bridge reset signal.

3. The computer system of claim 2 further comprising:
    a next bus configured to be coupled to said first device and to a next bus expander bridge;
    a next connection configured to be coupled between said first device and said next bus expander bridge, said next connection operable to couple a next bridge reset signal between said first device and said next bus expander bridge independent of said first bridge reset signal and said second bridge reset signal; and
    said next bus expander bridge having at least one expansion bus associated therewith and a last connection configured to be coupled between said associated expansion bus and said next bus expander bridge, said last connection operable to couple a next bus reset signal between said associated expansion bus and said next bus expander bridge responsive to said next bridge reset signal.

4. The computer system of claim 2 wherein said first device includes at least one reset enable control for each bus expander bridge being reset.

5. The computer system of claim 1 further comprising:
    a third bus configured to be coupled to said first device and to a second bus expander bridge;
    a third connection configured to be coupled between said first device and said second bus expander bridge, said third connection operable to couple a second bridge reset signal between said first device and said second bus expander bridge independent of said first bridge reset signal; and
    said second bus expander bridge having at least one expansion bus associated therewith and a fourth connection configured to be coupled between said associated expansion bus and said second bus expander bridge, said second connection operable to couple a second bus reset signal between said associated expansion bus and said second bus expander bridge responsive to said second bridge reset signal.

6. The computer system of claim 1 wherein said first device comprises a master bus controller.

7. The computer system of claim 1 wherein said first device comprises an integrated memory, input/output and bridge controller.

8. The computer system of claim 1 wherein said first device comprises a bus expansion bridge.

9. The computer system of claim 1 wherein said first bus expander bridge has a plurality of expansion buses associated therewith, each of said associated expansion buses having a separate connection configured to be coupled between said associated expansion bus and said first bus expander bridge and operable to couple a separate bus reset signal between said first bus expander bridge and said associated expansion bus.

10. The computer system of claim 1 further comprising:
    a compatibility bus expander bridge having at least one expansion bus associated therewith; and
    a first compatibility bus expander bridge connection configured to be coupled between said compatibility bus expander bridge and said second connection, said first compatibility bus expander bridge connection operable to couple a compatibility bus expander bridge reset signal between said second connection and said compatibility bus expander bridge.

11. The computer system of claim 10 further comprising a second compatibility bus expander bridge connection configured to be coupled between said compatibility bus expander bridge and said first bus expander bridge, said second compatibility bus expander bridge connection operable to couple a compatibility bus expander bridge reset completed signal between said compatibility bus expander bridge and said first bus expander bridge.

12. A method of independently resetting a bus expander bridge in a computer system including at least one processor coupled to a first bus, a first device coupled to said first bus and to a plurality of bus expander bridges, each bus expander bridge having at least one associated expansion bus, said method comprising:
    asserting a reset control signal applied to only a first bus expander bridge;
    resetting said first bus expander bridge to a default condition responsive to said reset control signal;
    asserting a local bus reset signal responsive to said reset control signal and applying said local bus reset signal to each of said at least one associated expansion bus; and deasserting said reset control signal and said local bus reset signal.

13. The method of claim 12 wherein said first device asserts said reset control signal responsive to a first command on said first bus.

14. The method of claim 12 wherein said first device deasserts said reset control signal responsive to a second command on said first bus.

15. The method of claim 12 wherein said first device deasserts said reset control signal after an interval initiated by receipt of said first command on said first bus.

16. The method of claim 12 wherein said first device deasserts said reset control signal after an interval initiated by receipt of a first command on said first bus and receipt of a second command on said first bus.

17. The method of claim 12 wherein said first device is coupled to each of said plurality of bus expander bridges through a dedicated bus and said method further comprises holding said dedicated bus in a reset state responsive to assertion of said reset control signal.

18. The method of claim 17 wherein said dedicated bus is released from said reset state responsive to deassertion of said reset control signal.

19. The method of claim 18 wherein said dedicated bus is synchronized and is resynchronized after release from said reset state.

20. The method of claim 19 wherein said first bus expander bridge is reset responsive to assertion of an internal reset signal and said internal reset signal is deasserted after said dedicated bus is resynchronized.

21. The method of claim 19 wherein said local bus reset signal is deasserted after said dedicated bus is resynchronized.

* * * * *